(12) United States Patent
Feinauer et al.

(10) Patent No.: US 7,124,666 B2
(45) Date of Patent: Oct. 24, 2006

(54) MULTIPLE SPINDLE MACHINE TOOL

(75) Inventors: Achim Feinauer, Göppingen (DE);
Bernd Kreissig, Eislingen (DE);
Markus Stanik, Albershausen (DE);
Reiner Widmann,
Böhmenkirch-Treffelhausen (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 0 days.

(21) Appl. No.: 11/029,283

(22) Filed: Jan. 5, 2005

(65) Prior Publication Data

US 2005/0139048 A1    Jun. 30, 2005

Related U.S. Application Data

(63) Continuation of application No. PCT/EP03/08101, filed on Jul. 24, 2003.

(30) Foreign Application Priority Data

Jul. 30, 2002    (DE)    ................. 102 35 873

(51) Int. Cl.
*B23B 3/30*    (2006.01)
(52) U.S. Cl. ............... 82/121; 82/122; 82/124; 82/129
(58) Field of Classification Search ........ 82/121, 82/122, 124, 125, 129; *B23B 3/30*
See application file for complete search history.

(56) References Cited

U.S. PATENT DOCUMENTS

| 4,197,769 | A | | 4/1980 | Smith et al. | |
|---|---|---|---|---|---|
| 5,148,091 | A | * | 9/1992 | Lagercrantz | 318/568.11 |
| 5,699,598 | A | | 12/1997 | Hessbrüggen et al. | |
| 5,704,262 | A | | 1/1998 | Baumbusch et al. | |
| 6,174,271 | B1 | * | 1/2001 | Kosmowski | 483/1 |
| 6,666,632 | B1 | | 12/2003 | Fioroni | |

FOREIGN PATENT DOCUMENTS

| DE | 87 11 148.9 U1 | 12/1987 |
|---|---|---|
| DE | 87 00 343 U1 | 6/1988 |
| DE | 41 36 916 A1 | 5/1993 |
| DE | 195 16 774 A1 | 11/1996 |
| DE | 199 45 567 C2 | 4/2001 |
| DE | 199 63 863 A1 | 7/2001 |
| FR | 2 590 340 A1 | 5/1987 |
| FR | 2 801 823 A1 | 6/2001 |
| IT | 1295463 | 5/1999 |

OTHER PUBLICATIONS

"Special Machine Series XG 690", Ex-Cell-O Brochure, Aug. 1998.

* cited by examiner

*Primary Examiner*—Monica Carter
*Assistant Examiner*—Sara Addisu
(74) *Attorney, Agent, or Firm*—Alston & Bird LLP

(57) ABSTRACT

In order to provide a multiple spindle machine tool having a machine frame, a first spindle slide with a first workpiece spindle, and a second spindle slide with a second workpiece spindle, wherein first spindle slide and second spindle slide are guided on the machine frame for linear displacement, and a tool receiving device, which is of a simple construction with minimized space requirements with respect to the workpiece spindles, a first guide and a spaced second guide are arranged on the machine frame, both the first spindle slide and the second spindle slide being guided on these guides, and the first workpiece spindle and the second workpiece spindle being arranged between the two guides.

38 Claims, 5 Drawing Sheets

MULTIPLE SPINDLE MACHINE TOOL

CROSS-REFERENCE TO RELATED APPLICATIONS

The present application is a continuation application of International Application No. PCT/EP2003/008101, filed Jul. 24, 2003, and also claims the benefit of German Application No. 102 35 873.7, filed Jul. 30, 2002, which are incorporated herein by reference in their entirety and for all purposes.

FIELD OF THE INVENTION

The invention relates to a multiple spindle machine tool comprising a machine frame, a first spindle slide with a first workpiece spindle, and a second spindle slide with a second workpiece spindle, wherein first spindle slide and second spindle slide are guided on the machine frame for linear displacement, and a tool receiving device.

BACKGROUND OF THE INVENTION

Multiple spindle machine tools can be used to machine several workpieces at the same time. Exemplary machine tools comprise a machine frame, a first spindle slide with a first workpiece spindle, and a second spindle slide with a second workpiece spindle, wherein first spindle slide and second spindle slide are guided on the machine frame for linear displacement, and a tool receiving device.

The machine tool described in EP 0 737 544 A2 comprises several spindles for the simultaneous separate machining of several workpieces, and partial slides are provided which are supported against one another and form a whole slide, wherein only the whole slide is guided by a guiding arrangement on the base member of the machine. Additional multiple spindle machine tools are known, for example, from U.S. Pat. No. 4,197,769, DE 87 11 148.9 U1, DE 87 00 343.0 U1, IT 1295463 or DE 195 16 774 A1.

SUMMARY OF THE INVENTION

In accordance with the invention, a multiple spindle machine tool that is of a simple construction with minimized space requirements with respect to the plurality of workpiece spindles is provided. In accordance with the invention, a first guide and a spaced second guide are arranged on the machine frame, both the first spindle slide and the second spindle slide being guided on these guides, and that the first workpiece spindle and the second workpiece spindle are arranged between the two guides. The invention provides for the spindle slides to be guided on the same guides. As a result, it is not necessary for the spindle slides to be supported against one another. Since, in accordance with the invention, the two workpiece spindles are arranged between the two guides, the space requirements for the workpiece spindles are minimized since it is just this space which is used for the arrangement of the workpiece spindles, and also no supporting arrangement is necessary between the two spindle slides.

A more simple construction of the machine may be realized when the first spindle slide and the second spindle slide are not mechanically coupled and so advantages with respect to production techniques result during the manufacture of the inventive multiple spindle machine tool. Since a support between the two spindle slides is also not provided, the number of parts subject to wear and tear (e.g., guides) is minimized and so the resources required for maintenance are also minimized.

Considerable stability with respect to the arrangement of the workpiece spindles on the associated spindle slides may be achieved when the first or second spindle slide, respectively, has a greater contact surface area with the first and second guides, respectively, than with the second and first guides, respectively. As a result, it is possible, on the one hand, for both the first spindle slide and the second spindle slide to be guided on the same guides. On the other hand, an area may then be made available on the first spindle slide and the second spindle slide, respectively, for supporting the associated workpiece spindles.

In particular, the first or second spindle slide, respectively, then has a greater number of guide shoes for the first and second guides, respectively, than for the second and first guides, respectively, in order to make the greater contact surface areas available for the first and second guides, respectively, accordingly. In other words, the first spindle slide has a greater contact surface area with the first guide than with the second guide. For example, the first spindle slide can have a greater number of guide shoes for the first guide than for the second guide. Conversely, the second spindle slide has a greater contact surface area with the second guide than with the first guide. For example, the second spindle slide can have a greater number of guide shoes for the second guide than for the first guide.

In addition, it is favorable when the first or second spindle slide, respectively, has an L-shaped or triangular configuration, in particular, with a first arm which is oriented along the first and second guides, respectively, and with a second arm which is oriented transversely to the first and second guides, respectively. In this way, considerable stability and rigidity of the spindle slides are provided and so these can support the associated workpiece spindles and very precise machining procedures can be carried out. As a result, a spatial area is also made available, in which the associated workpiece spindles can be supported on the respective spindle slides. In particular, the two spindle slides can then be placed opposite one another so that the L shape and the approximate triangular shape, respectively, complement one another in a manner located opposite one another. As a result, the workpiece spindles can, on the other hand, be positioned between the two guides in a manner optimizing space. The L configuration or rather the triangular configuration relates, in this respect, to at least one area of the corresponding spindle slides close to the guides in a projection onto these guides.

It is then provided, in particular, for the second arm of the first spindle slide and the second spindle slide, respectively, to be coupled to the second and first guides, respectively, in order to enable both spindle slides to be displaceable on the same guides.

In addition, it is favorable when the first or second workpiece spindle, respectively, is seated between and/or on the two arms of the respective spindle slide. As a result, it is possible for the respective workpiece spindles to be seated between the two guides in a manner associated with one another and so when their displacement guidance on the guides is very stable and the arrangement is very rigid the spatial requirements for the workpiece spindles are minimized.

It is favorable, in particular, when the second arms of the first spindle slide and of the second spindle slide are parallel to one another in order to minimize the spatial requirements in this way.

The two guides are advantageously parallel to one another in order make a linear displacement of the two spindle slides possible in a simple way.

In an embodiment which is simple from the point of view of production techniques, the guides comprise guide rails, on which the spindle slides are then guided via corresponding guide shoes.

It is particularly advantageous for the machining of workpieces when the first workpiece spindle and the second workpiece spindle are arranged on the associated spindle slide for respective linear displacement in a direction of displacement (Z direction). As a result, workpieces which are clamped on the respective workpiece spindles may then be displaced relative to tools which are arranged on the machine frame so as to be, in particular, secure against translational movement. Milling and rotary machining procedures can then be carried out in order to produce, for example, constant velocity joints (homocinetic joints).

In this respect, the direction of displacement (Z direction) of a workpiece spindle is, in particular, transverse to and, in particular, at right angles to a direction of displacement (X direction) of the associated spindle slide. Workpieces may then be supplied to the tools and removed from them via the spindle slides and, in addition, a fine positioning of the workpieces relative to the tools is possible and the vertical spacing between tools and workpieces may be varied via the workpiece spindles.

The first and second guides are advantageously arranged on the machine frame so as to be aligned horizontally. A vertical machining of a workpiece may then also be realized in a simple way, wherein the workpiece spindles, in particular, are guided vertically on the associated spindle slide for this purpose.

In addition, it is favorable when the tool receiving device has a first tool receiver and a second tool receiver so that two workpieces can be machined at the same time with two different tools (which can be of an identical design). In order to make such a simultaneous machining possible, the two tool receivers are favorably arranged between the two guides.

It is particularly advantageous when the two tool receivers are arranged on a rocker arm so that they can be moved synchronously and, in particular, can be pivoted relative to the machine frame and, therefore, to the workpiece spindles.

A great number of possibilities for machining a workpiece result when the tool receiving device is arranged on the machine frame so as to be pivotable and can then be pivoted about an axis transversely and/or parallel to the direction of displacement of the spindle slides. In this way, programmable paths for a constant velocity joint as workpiece can, for example, be generated. Milling procedures can be carried out in a defined angular position with respect to a Z direction, the direction of displacement of the workpiece spindles. The movement of the spindle slides, the workpiece spindles and the tool receiving device can be program-controlled, in particular, in order to be able to machine a workpiece in a very precise and defined way in a controlled manner.

In this respect, it is provided, in particular, for the two spindle slides to be movable synchronously or independently of one another in a controlled manner. A synchronous movement is advantageous, for example, when a greater distance is intended to be covered in short periods of time without the highest precision being required. For example, this is advantageous when workpieces to be machined are received and when machined workpieces are removed. If a very precise machining is necessary, it is then more favorable when the spindle slides are movable independently of one another in a controlled manner in order to be able to carry out, for example, correctional movements independently of one another. The corresponding types of movement of the two spindle slides are preferably controlled via a control device.

It may also be provided for the two workpiece spindles to be movable synchronously or independently of one another in a controlled manner. This movement may be controlled in X direction and/or Z direction (via the workpiece spindles).

In one embodiment, a supporting guide is provided for the first spindle slide and/or second spindle slide. As a result, a self-contained guide system may be formed, via which forces may be absorbed in an optimum manner. Such a supporting guide in addition to the first and second guides is advantageous, in particular, when linear motors are provided for driving the spindle slides. Linear motors cause considerable forces which can be in the order of magnitude of 40,000 N. Forces such as these may be absorbed via the supporting guide. The supporting guide is arranged and designed, in particular, such that forces exerted by a linear motor can be absorbed and, therefore, horizontal and vertical forces can be absorbed.

It is favorable when the supporting guide is arranged above the first guide and second guide for the spindle slides. As a result, a space is made available, in which the linear motor may be arranged, namely just between the supporting guide and the first and second guides, respectively. With this arrangement, the corresponding forces which are exerted by the linear motor can, on the other hand, be absorbed by the spaced supporting guide in a defined manner.

The supporting guide comprises, in particular, a first guiding device which is arranged on the associated spindle slide with an extension in the direction of displacement and a second corresponding guiding device which is arranged on the machine frame. With this design, forces may be absorbed accordingly in an optimized manner.

It is favorable when a linear motor for the associated spindle slide is seated between the supporting guide and the first guide and second guide, respectively. For example, a primary part may be arranged on the slide, namely beneath the supporting guide, and a secondary part can be arranged on the machine frame, namely, again, beneath the supporting guide.

The first part of the guide is preferably seated on a side wall of the associated spindle slide so that the mass of a spindle slide need not be increased substantially when an additional supporting guide is provided.

BRIEF DESCRIPTION OF THE DRAWINGS

Preferred exemplary embodiments of the invention are explained in more detail hereinbelow with reference to the drawings, in which.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
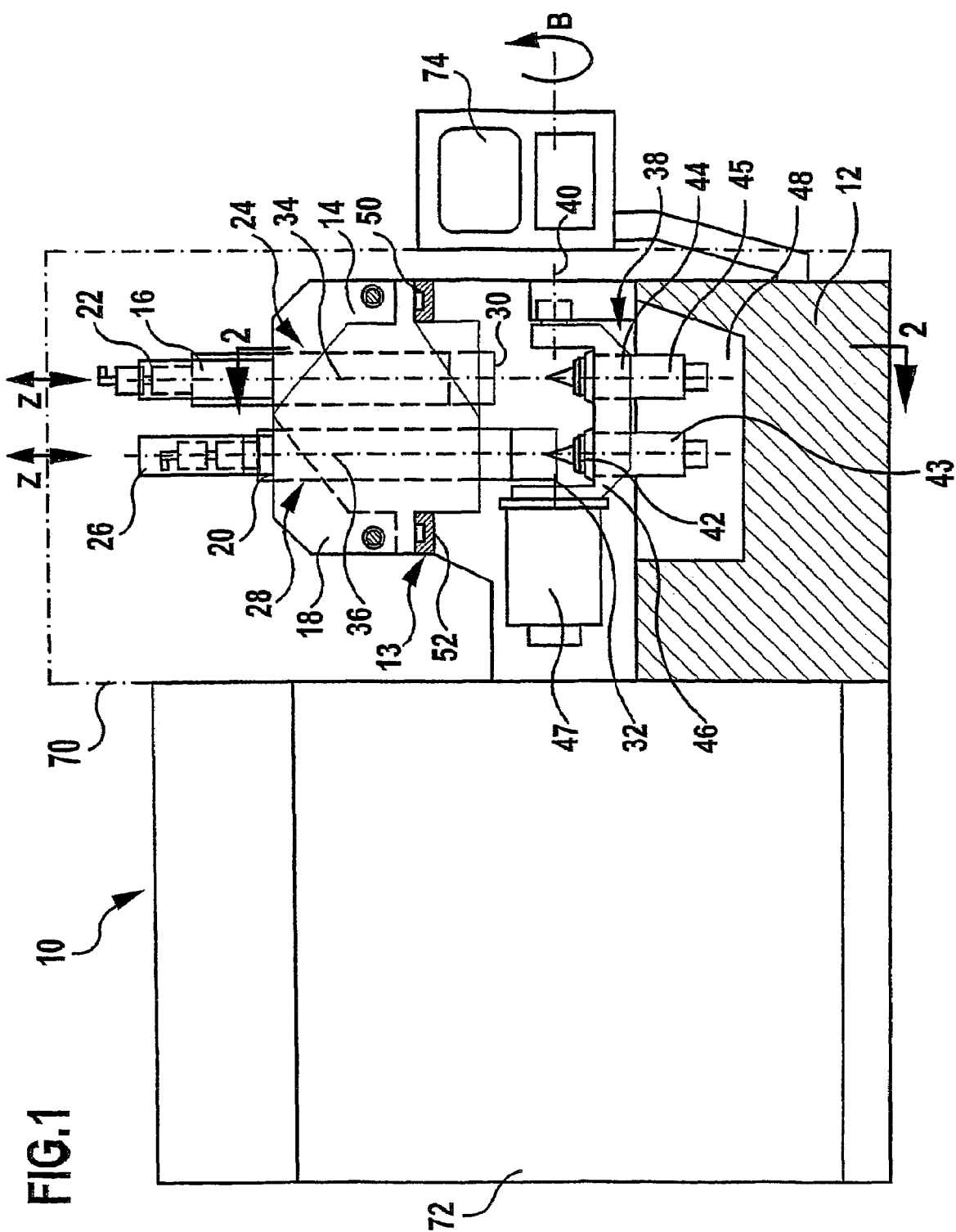
FIG. 1 shows a lateral sectional view of one embodiment of an inventive multiple spindle tool machine.

One embodiment of an inventive multiple spindle machine tool is a dual spindle machine tool which is designated in FIG. 1 as a whole as 10. The machine tool 10 comprises a machine frame 12, via which the multiple spindle machine tool can be positioned on a base in an aligned manner. A first spindle slide 14 is guided on the machine frame 12 on an attachment stand 13 for linear displacement in a direction X. This direction X is, in particular, a horizontal direction. The first spindle slide 14 bears a first workpiece spindle 16, on which a workpiece to be machined can be fixed so as to be rotatable. The first workpiece spindle 16 is guided on the first spindle slide 14 for displacement in a transverse direction Z in relation to the direction X so that the distance of a workpiece held on the first workpiece spindle 16 relative to the machine frame 12 can be adjusted. An axis of rotation of the first workpiece spindle 16, about which a held workpiece can be rotated, is parallel to the Z direction.

In addition, a second spindle slide 18 is provided which is likewise guided on the machine frame 12 for linear displacement in the X direction. This second spindle slide 18 supports a second workpiece spindle 20 which is supported on the second spindle slide 18 for linear displacement in the Z direction. The two workpiece spindles 16 and 20 are, in particular, aligned essentially parallel to one another.

A first drive 22 is provided for driving the first workpiece spindle 16 in its displacement movement along the Z axis. In this respect, this drive can be, for example, a hydraulic drive, a spherical worm gear or a linear motor. A drive unit of the first drive 22 is seated on the first spindle slide 14 and is moved with it in X direction.

For guiding the first workpiece spindle 16, the first spindle slide 14 has a guiding device which is designated as a whole as 24 and on which the first workpiece spindle 16 can be displaced in Z direction, driven by the first drive 22. The Z direction is aligned, in particular, vertically, i.e., parallel to the direction of gravity.

In order to move the second workpiece spindle 20 relative to the second spindle slide 18, a second drive 26 is provided which drives the linear displacement of the second workpiece spindle 20 on a guiding device 28 in Z direction relative to the second spindle slide 18.

The workpiece spindles 16 and 20 are provided at their respective lower ends with a workpiece holder 30, 32, on which the respective workpieces can be fixed so as to be rotatable about longitudinal axes 34, 36 of the respective workpiece spindles 16, 20.

A tool receiving device 38 is arranged on the machine frame 12 so as to be, for example, pivotable, wherein a pivot axis 40 is oriented transversely to the Z direction and X direction and is aligned, in particular, horizontally. The tool receiving device 38 comprises in the case of a dual spindle machine tool a first tool receiver 42 and a second tool receiver 44 which are spaced in relation to one another. The tool receivers 42, 44 are seated on rotatingly driven tool spindles 43, 45 so that the tools held accordingly, such as milling tools or drilling tools, are rotatable about a spindle axis. Two workpieces can then be machined at the same time by means of respective tools, wherein a first workpiece is held on the first workpiece spindle 16 and a second workpiece is held on the second workpiece spindle 20.

The two tool receivers 42 and 44 are seated on a yoke-shaped rocker arm 46 which is pivotable about the pivot axis 40 in a pivoting direction B (FIG. 1). A drive 47 is provided for carrying out the pivoting movement. In this respect, each pivot position of the tool receiving device 38 can be adjusted within a specific pivoting range and so in the case of a specific adjusted pivot position (at a specific adjusted pivoting angle B), the respective workpieces held on the workpiece spindles 16 and 20 can be machined via the tools fixed on the tool receiving device 38 and, in particular, present in the tool receivers 42, 44. For example, a constant velocity joint, which has ball grooves in a stud axle and in a hub, may be produced in this way.

It is possible, in particular, to carry out a soft milling machining, grinding machining or hard milling machining via corresponding tools. It is also possible to carry out a hard rotary machining.

For this purpose, corresponding auxiliary attachments, such as, for example, one or more lathe consoles 49 with a corresponding lathe tool (FIG. 2) or additional spindles are provided and these are arranged in the area of the machining zone of the workpieces.

It is also possible to carry out follow-up machining of a workpiece in that this is machined, for example, first of all with a first tool, held on the first workpiece spindle 16 and, subsequently, transferred to the workpiece spindle 20 and then machined with a second tool.

A pivoting space 48 is formed in the machine frame 12 so that the tool receiving device 38 can be pivoted on the machine frame 12 in a specific pivoting range without any hindrance. Turnings and the like may also be removed through this pivoting space 48.

The spindle slides 14 and 18 are guided for displacement in the X direction above the tool receiving device 38 with respect to the Z direction. For this purpose, a first guide 50 is provided which comprises, in particular, a guide rail which is arranged at a distance to the tool receiving device 38 above the same. Furthermore, a second guide 52 is provided which is spaced parallel to the first guide 50 and arranged, in particular, at the same level in Z direction above the tool receiving device 38 as the first guide 50. The second guide 52 again comprises, in particular, a guide rail. The two guides 50 and 52 are arranged, in particular, horizontally. The guides 50, 52 are seated on the attachment stand 13.

It may also be provided for the guides 50, 52 to be arranged so as to be offset in Z direction in order to, for example, be able to additionally strengthen a spindle slide in its vertical direction when this is necessary.

The first spindle slide 14 is designed in its area facing the guides 50, 52 so as to be L-shaped or triangular in such a manner that it comprises a first arm 54 which is oriented along the first guide 50 and is guided on this. For example, two spaced guide shoes 56a, 56b are provided in order to guide the first arm 54 on the first guide 50 for linear displacement. A second arm 58 is connected to the first arm 54 and this is oriented transversely to the first arm 54 and is coupled to the second guide 52, for example, by means of a guide shoe 60 in order to guide the second arm 58 on the second guide 52 for linear displacement.

Between the two arms 54 and 58, the first workpiece spindle 16 is seated on them between the two guides 50 and 52.

The contact surface area of the first spindle slide 14 with the first guide 50 for the linearly displaceable coupling thereto is greater than the contact surface area for the coupling to the second guide 52. For example, the first contact surface area is formed via the two guide shoes 56a, 56b whereas it is formed for the second guide 52 only via the one guide shoe 60.

The second spindle slide 18 likewise comprises a first arm 62 which is oriented along the second guide 52 and is coupled to this, for example, via two guide shoes 64a, 64b. A second arm 66, which is coupled to the first guide 50 via a guide shoe 68, is seated transversely to this first arm 62. As a result, the second spindle slide 18 also has an L-shaped or triangular external configuration, wherein the contact surface area with the second guide 52 is greater than with the first guide 50. The second workpiece spindle 20 is seated between and on the first arm 62 and the second arm 66 between the two guides 50 and 52 and faces the other workpiece spindle 16 with a free intermediate area between the two workpiece spindles 16, 20.

The L-shaped or triangular configuration relates to a cross section in a projection onto the plane defined by the two guides 50, 52, at least in the area of the coupling of the spindle slides 14 and 18, respectively, to these guides 50 and 52.

The two second arms 58 and 66 of the respective spindle slides 14 and 18 are oriented parallel to one another. The two spindle slides 14 and 18 are not mechanically coupled and so they move, in principle, independently of one another in X direction. The two workpiece spindles 16 and 20 face one another between the two guides 50, 52, held on the respective spindle slides 14 and 18 in a manner optimizing space, wherein they are seated between and on the respective first arms 54, 62 and second arms 58, 66. As a result, adequate stability is provided and an area, at which the corresponding guiding devices 24 and 28 for the linear guidance of the workpiece spindles 16 and 20 in Z direction may be formed.

The inventive multiple spindle machine tool is, as indicated in FIG. 1, provided with a protective housing 70, by means of which a working area of the movable spindle slides 14, 18, the movable workpiece spindles 16 and 20 and the movable tool receiving device 38 (with respect to pivotability and rotation of the tools themselves) can be separated from the surrounding space. A control housing 72 is provided for accommodating, for example, electrical supply means. An operator can set the corresponding operating modi of the machine tool 10 via an operating panel 74 which is arranged, in particular, outside the protective housing 70.

The spindle slides 14 and 18 are driven by, in particular, independent drives 76 and 77 (FIG. 2) with respect to their displacement movements along the X direction. In this respect, the drives may, for example, be spherical worm gears, hydraulic drives or linear motor drives. The traveling movements of the spindle slides 14, 18 can be program-controlled.

A feeding device 78 is provided for feeding workpieces to be machined and this comprises, in particular, a feeding conveyor 80. Two workpieces may be positioned via feeding slides 82 at a specific distance such that they can be taken up by the two workpiece spindles 16 and 20 and then be fed to a machining zone at the tool receiving device 38. The feeding device comprises, in particular, workpiece lifters 79, 81 in order to be able to lift the workpieces in Z direction relative to the machine frame 12 and, therefore, be able to feed them to the workpiece spindles 16, 20.

Finished workpieces may be removed via a removal device 84 which comprises, in particular, a removal conveyor 86. Workpiece lifting devices 85, 87 are provided, in particular, in order to be able to lift the machined workpieces from the workpiece spindles 16, 20 onto the removal conveyor 86.

The inventive multiple spindle machine tool 10 functions as follows. The workpieces to be machined are positioned via the feeding device 78, the feeding slides 82 and the workpiece lifters 79, 81 such that a first workpiece to be machined can be taken up by the first workpiece spindle 16 and a second workpiece to be machined by the second workpiece spindle 20. The two spindle slides 14 and 18 are thereby positioned in relation to the feeding device 78 such that it is possible to take up the workpieces.

The two spindle slides 14 and 18 are then moved towards the tool receiving device 38 in order to be able to start the desired machining procedure. The corresponding tools are fixed on the two tool receivers 42, 44 in order to make, for example, a milling machining of the blank possible. Two workpieces may be machined at the same time.

A defined distance relative to the tool receiving device 38 may be set by moving the workpiece spindles 16 and 20 in Z direction by means of a program control and, therefore, the milling depth may be set and varied, for example, during the machining. By moving the spindle slides 14, 18 in X direction during the machining, corresponding machining procedures may likewise be carried out.

The tool receiving device 38 is in a specific pivot position B during the machining in order, for example, to be able to produce recesses in a specific direction or make specific angular positions possible. The workpieces held on the workpiece spindles 16 and 20 may be turned via them.

Figure 2:
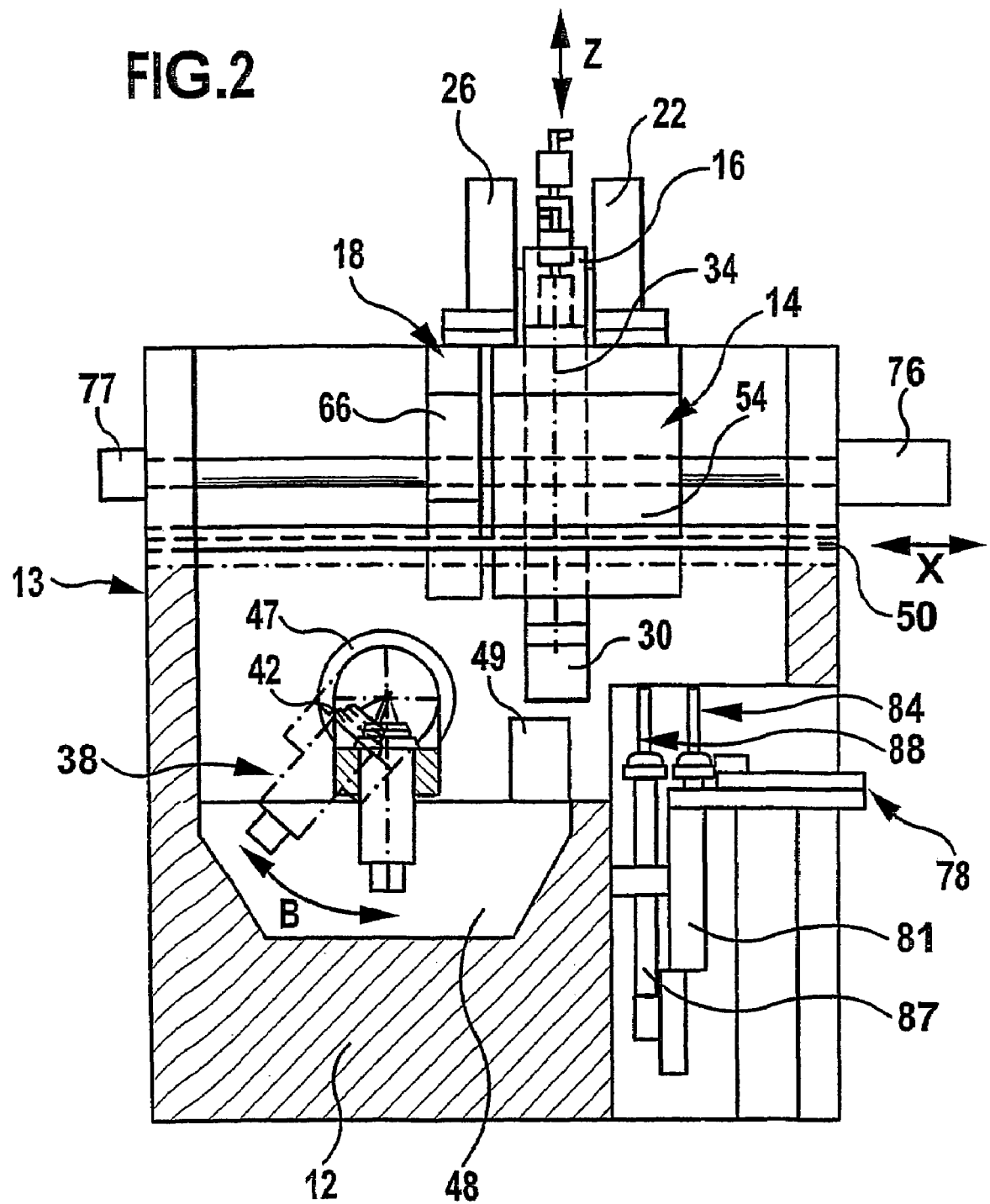
FIG. 2 shows a sectional view along line 2—2 of FIG. 1.
Figure 3:
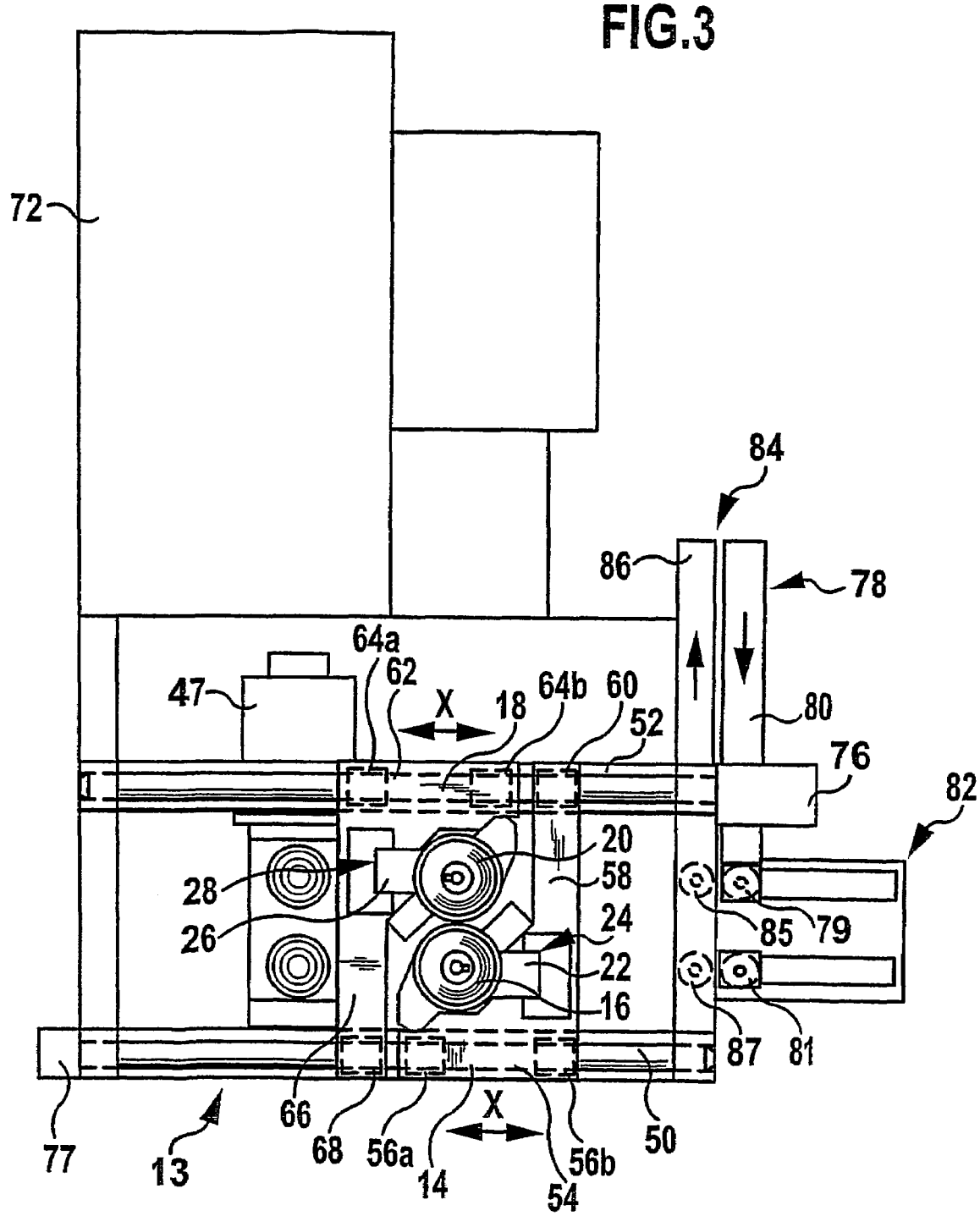
FIG. 3 shows a plan view of the multiple spindle machine tool according to FIG. 1.

Constant velocity joints (homocinetic joints) may, for example, be produced via the inventive multiple spindle machine tool 10. In FIG. 2, corresponding workpieces are indicated by the reference numeral 88. A homocinetic joint comprises a stud axle, a hub and a ball cage. Depending on the machining program set, recesses, such as, for example, spherical grooves in the stud axle, may be ground, turned and/or milled, hubs ground, turned and/or milled, the ball cage milled, turned and/or ground. All these machining procedures may be carried out with the inventive multiple spindle machine tool with a corresponding program control.

The two spindle slides 14 and 18 can be displaced on the guides 50 and 52 independently of one another, wherein a synchronous movement can be generated via a control device. The two spindle slides 14 and 18 can also be displaced individually, controlled independently of one another, by the control device in order to be able, in particular, to carry out correctional movements so that both workpieces can be machined individually in a very precise manner.

The L-shaped or triangular design of the two spindle slides 14 and 18 with respect to their coupling to the guides 50 and 52 makes a space-saving arrangement of the workpiece spindles 16 and 20 possible with considerable stability of the slide guidance in X direction. As a result, a very precise vertical machining of two workpieces may be carried out at the same time with minimized machine dimensions.

In the case of one embodiment, with which the spindle slides are driven via a linear motor, it is advantageous when an additional supporting guide is provided in order to be able to absorb the forces which are exerted by the linear motors. Such forces can be in the order of magnitude of 40,000 N.

Figure 4:
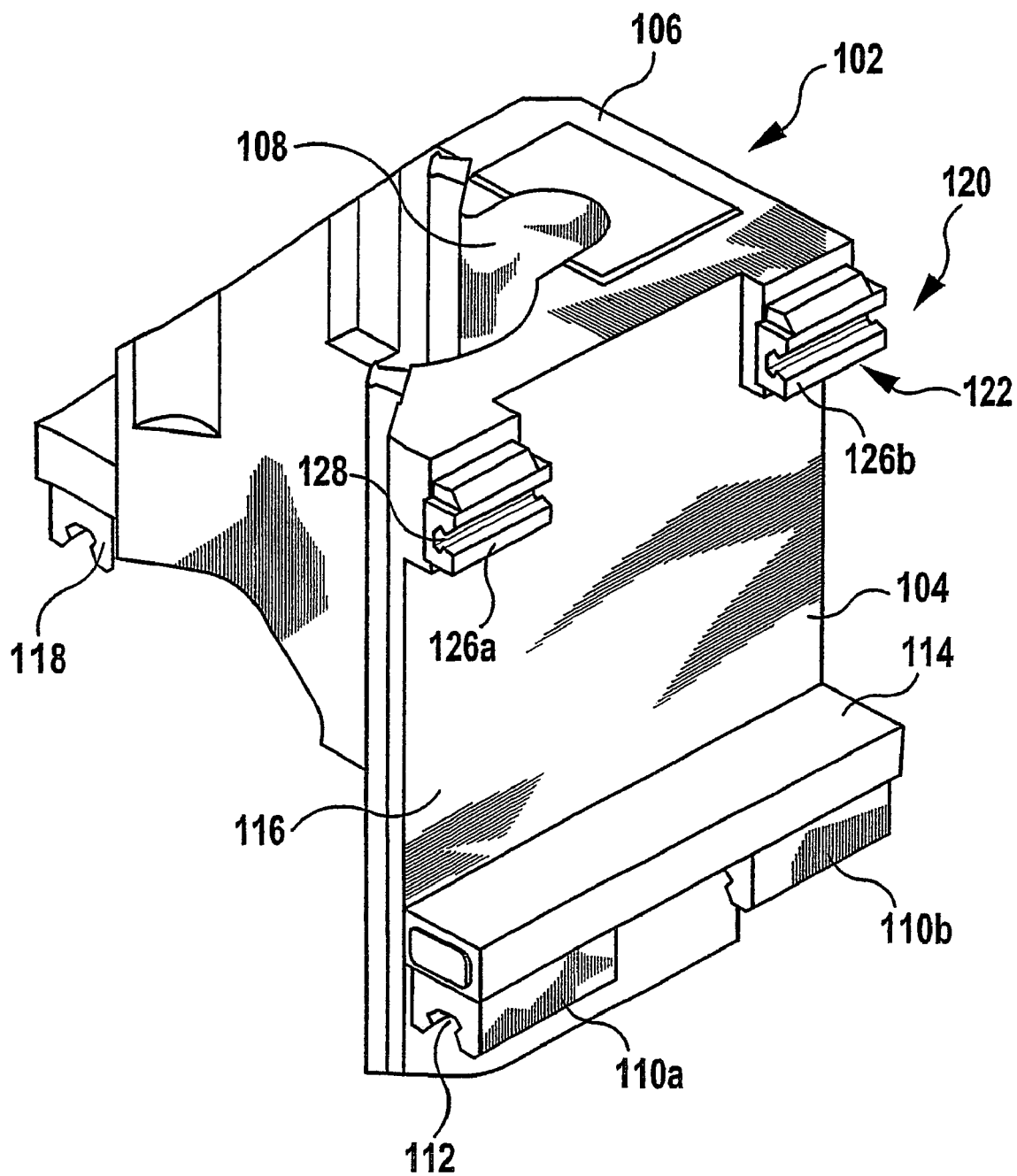
FIG. 4 shows a partial illustration of an additional embodiment of a spindle slide.

In FIG. 4, one embodiment for a corresponding spindle slide is shown in a partial illustration and this is designated as a whole as 102. The spindle slide 102 corresponds, for example, to the first spindle slide 14. The spindle slide 102 has a first arm 104 and a second arm 106, wherein the second arm 106 is oriented transversely to the first arm 104. As a result, the spindle slide 102 has an L-shaped or triangular configuration. A workpiece spindle is supported on the two arms 104 and 106 for linear displacement (not shown in FIG. 4), as described above in conjunction with the spindle slides 14 and 18. The spindle slide 102 has a receiver 108 for the associated workpiece spindle.

The spindle slide 102 has a first guide shoe 110a and a second guide shoe 110b which serve to guide the spindle slide 102 in the guide 50. The guide 50 comprises for this purpose, for example, a guide bar with a guide web which extends in the direction of displacement X and points upwards. The guide shoes 110a and 110b each have a receiver 112 for this guide bar; the guide bar is accommodated by the receiver 112. The guide bar and the receiver 112 are adapted to one another such that any transverse movement between the guide shoes 110a, 110b and the guide bar transversely to the direction of displacement X is essentially blocked. This is brought about, for example, by a form-locking, adapted design of the receiver 112 and the guide bar. In the embodiment shown in FIG. 4, the guide shoes 110a, 110b are seated on a support element 114 which is held on a side wall 116 of the first arm 104.

An additional guide shoe 118, which is arranged, in particular, so as to be located opposite the second guide shoe 110b, is seated on the second arm 106. Guidance of the spindle slide 102 on the second guide 52 spaced from the first guide 50 is provided for via this guide shoe 118. The guide shoe 118 is placed accordingly onto a guide bar of the second guide 52, as described in conjunction with the guide shoes 110a and 110b. The guide shoe 118 is preferably located at the same vertical height as the guide shoes 110a and 110b. However, it is, in principle, also possible for a difference in height to be present between the guide shoe 118 and the guide shoes 110a, 110b.

Figure 5:
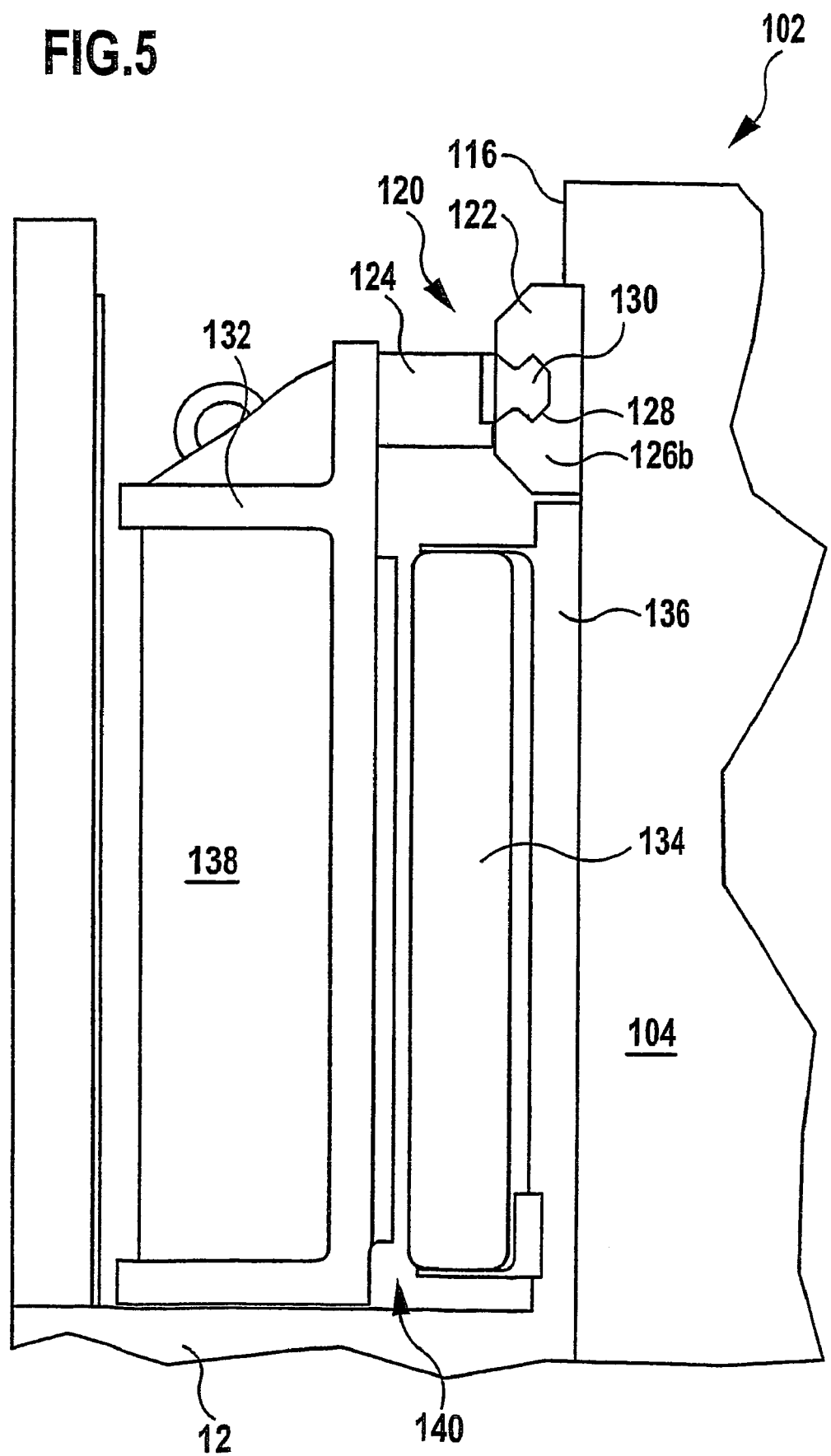
FIG. 5 shows a schematic partial illustration of a guiding device for the guidance of the slide according to FIG. 4 for linear displacement.

A guiding device for guiding the slide 102 on the inventive machine tool comprises, in addition, a supporting guide 120 (FIGS. 4 and 5). The supporting guide has a first guiding device 122 which is arranged on the slide 102 and a second guiding device 124 which corresponds to the first guiding device 122 and is arranged on the machine frame 12.

The first guiding device 122 is arranged on the first arm 104 and, in particular, its side wall 116. It comprises, for example, two spaced guide shoes 126a and 126b. The first guiding device 122 with its guide shoes 126a, 126b is arranged on the first arm 104 above the guide shoes 110a, 110b for the guide 50 in relation to the Z direction. The guide shoes 126a, 126b each have a receiver 128, in which a guide bar 130 of the second guiding device 124 engages and, in particular, engages in a form-locking manner such that any movement transverse to the direction of displacement X is blocked.

The receiver 128 is preferably open in a direction which is transverse and, in particular, at right angles to the direction, in which the receivers 112 of the guide shoes 110a, 110b are open. The second guiding device 124 with its guide bar 130 can, as a result, engage laterally in the guide shoes 126a, 126b.

The receiver 128 has an extension along the direction of displacement X. The guide bar 130 likewise has an extension in this direction of displacement, wherein the guide bar 130 is designed to be continuous. It is seated above a supporting angle bracket 132 (FIG. 5) so as to be stationary in relation to the machine frame 12 above the guides 50 and 52 with respect to the Z direction.

A corresponding element of a linear motor is seated on the spindle slide 102 on the first arm 104 between the support element 114, which again supports the guide shoes 110a, 110b for the first guide 50, and the first guiding device 122. In the case of a short stator linear motor, a stator (primary part) 134 is seated on the arm 104. A supporting frame 136, which is again fixed on the side wall 116 of the first arm 104, is provided for fixing the primary part in place.

A linear motor 140 is formed by a secondary part 138, which can comprise several secondary elements, and the primary part 134. The secondary part 138 is then arranged on the supporting angle bracket 132 so as to be located opposite the primary part 134 and facing it. It can also be provided for the stator 134 to be seated on the supporting angle bracket 132 and the secondary part to be seated on the slide 102 (long stator linear motor).

As a result of the supporting guide 120, the forces caused by the linear motor 140 can be absorbed and so a self-contained guiding system for the slide 102 is formed. Since the forces of the linear motor 140 act essentially transverse to the Z direction, the receivers 128 of the guide shoes 126a, 126b are also open transversely to the Z direction. The supporting guide 120 is vertically spaced in relation to the first guide 50 and to the second guide 52.

A second spindle slide is provided which corresponds to the spindle slide 18. This second spindle slide (not shown in the drawings) is, in principle, of the same design as the spindle slide 102 described above, wherein it is, however, adapted in its L-shaped or triangular configuration such that it corresponds to the spindle side 102, i.e., it is designed to be mirror symmetrical in such a manner that its first arm, which has the larger guide surface, is spaced parallel to the first arm 104 of the spindle slide 102 and its second arm, on which the single guide shoe is seated, is spaced parallel to the second arm 106 of the spindle slide 102. Otherwise, the corresponding machine tool operates as described above.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. Multiple spindle machine tool, comprising:
a machine frame;
a tool receiving device;
a first spindle slide with a first workpiece spindle;
a second spindle slide with a second workpiece spindle;
wherein the first spindle slide and second spindle slide are guided on the machine frame for linear displacement above the tool receiving device;
a first guide; and
a spaced second guide;
wherein the first guide and the second guide are arranged on the machine frame, both the first spindle slide and the second spindle slide being guided on said guides;

wherein the first spindle slide comprises a first arm oriented along the first guide and a second arm oriented transversely to the first guide, the second arm of the first spindle slide being coupled to the second guide;

wherein the second spindle slide comprises a first arm oriented along the second guide and a second arm oriented transversely to the second guide, the second arm of the second spindle slide being coupled to the first guide; and wherein the first workpiece spindle and the second workpiece spindle are arranged between the two guides using the space between the two guides.

2. Multiple spindle machine tool as defined in claim 1, wherein the first spindle slide and the second spindle slide are not mechanically coupled.

3. Multiple spindle machine tool as defined in claim 1, wherein the first spindle slide has a greater contact surface area with the first guide than with the second guide.

4. Multiple spindle machine tool as defined in claim 3, wherein the first spindle slide has a greater number of guide shoes for the first guide than for the second guide.

5. Multiple spindle machine tool as defined in claim 1, wherein the second spindle slide has a greater contact surface area with the second guide than with the first guide.

6. Multiple spindle machine tool as defined in claim 5, wherein the second spindle slide has a greater number of guide shoes for the second guide than for the first guide.

7. Multiple spindle machine tool as defined in claim 1, wherein the first spindle slide has an L-shaped or triangular configuration at least in the vicinity of the guides.

8. Multiple spindle machine tool as defined in claim 1, wherein the first workpiece spindle is seated between the two arms of the first spindle slide or is seated on the two arms or is seated between the two arms and on the two arms.

9. Multiple spindle machine tool as defined in claim 1, wherein the second spindle slide has an L-shaped or triangular configuration at least in the vicinity of the guides.

10. Multiple spindle machine tool as defined in claim 1, wherein the second workpiece spindle is seated between the first arm and the second arm of the second spindle slide or is seated on the first arm and the second arm or is seated between the first arm and the second arm and on the first arm and the second arm.

11. Multiple spindle machine tool as defined in claim 1, wherein the second arms of the first spindle slide and the second spindle slide are parallel to one another.

12. Multiple spindle machine tool us defined in claim 1, wherein the two guides are parallel to one another.

13. Multiple spindle machine tool as defined in claim 1, wherein the guides comprise guide rails.

14. Multiple spindle machine tool as defined in claim 1, wherein the first workpiece spindle and the second workpiece spindle are supported on the associated spindle slide for respective linear displacement in a direction of displacement.

15. Multiple spindle machine tool as defined in claim 14, wherein the direction of displacement of a workpiece spindle is transverse to a direction of displacement of the associated spindle slide.

16. Multiple spindle machine tool as defined in claim 1, wherein the first guide and second guide are arranged on the machine frame so as to be aligned horizontally.

17. Multiple spindle machine tool as defined in claim 1, wherein the workpiece spindles are guided vertically on the associated spindle slide.

18. Multiple spindle machine tool as defined in claim 1, wherein the tool receiving device has a first tool receiver and a second tool receiver.

19. Multiple spindle machine tool as defined in claim 18, wherein the two tool receivers are arranged between the two guides.

20. Multiple spindle machine tool as defined in claim 18, wherein the two tool receivers are arranged on a rocker arm.

21. Multiple spindle machine tool as defined in claim 1, wherein the tool receiving device is arranged on the machine frame so as to be pivotable.

22. Multiple spindle machine tool as defined in claim 1, wherein the two spindle slides are movable synchronously or independently of one another in a controlled manner.

23. Multiple spindle machine tool as defined in claim 1, wherein the two workpiece spindles are movable synchronously or independently of one another in a controlled manner.

24. Multiple spindle machine tool as defined in claim 1, wherein a workpiece is held on a workpiece spindle so as to be rotatable for rotary machining.

25. Multiple spindle machine tool as defined in claim 1, wherein a supporting guide is provided for at least one of the first spindle slide and the second spindle slide.

26. Multiple spindle machine tool as defined in claim 25, wherein the supporting guide is arranged and designed such that forces exerted by a linear motor are absorbable.

27. Multiple spindle machine tool as defined in claim 26, wherein horizontal and vertical forces are absorbable by the supporting guide.

28. Multiple spindle machine tool as defined in claim 25, wherein the supporting guide is arranged above the first guide and second guide for the spindle slides.

29. Multiple spindle machine tool as defined in claim 25, wherein the supporting guide comprises a first guiding device arranged on the associated spindle slide with an extension in the direction of displacement and comprises a second corresponding guiding device arranged on the machine frame.

30. Multiple spindle machine tool as defined in claim 29, wherein the first guiding device is seated on a side wall of the associated spindle slide.

31. Multiple spindle machine tool as defined in claim 25, wherein a linear motor for the associated spindle slide is seated between the supporting guide and the first guide.

32. Multiple spindle machine tool as defined in claim 25, wherein a linear motor for the associated spindle slide is seated between the supporting guide and the second guide.

33. Multiple spindle machine tool as defined in claim 1, wherein the first spindle slide and the second spindle slide are mirror symmetrical to each other.

34. Multiple spindle machine tool, comprising:
a machine frame;
a first spindle slide with a first workpiece spindle;
a second spindle slide with a second workpiece spindle;
wherein the first spindle slide and second spindle slide are guided on the machine frame for linear displacement;
linear motors for driving the first spindle slide and the second spindle slide;
a tool receiving device;
a first guide; and
a spaced second guide;
wherein the first guide and the second guide are arranged on the machine frame, both the first spindle slide and the second spindle slide being guided on said guides;
wherein the first workpiece spindle and the second workpiece spindle are arranged between the two guides; and wherein a supporting guide is provided for at least one of the first spindle slide and the second spindle slide, wherein the supporting guide is arranged above the first guide and second guide for the spindle slides.

35. Multiple spindle machine tool, comprising:
a machine frame;
a tool receiving device;
a first spindle slide with a first workpiece spindle, the first spindle slide having an L-shaped or triangular configuration;
a second spindle slide with a second workpiece spindle, the second spindle slide having an L-shaped or triangular configuration;
wherein the first spindle slide and second spindle slide are guided on the machine frame for linear displacement above the tool receiving device;
a first guide; and
a spaced second guide;
wherein the first guide and the second guide are arranged on the machine frame, both the first spindle slide and the second spindle slide being guided on said guides; and
wherein the first workpiece spindle and the second workplace spindle are arranged between the two guides facing each other and arranged vertically on their associated spindle slide using the space between the two guides.

36. Multiple spindle machine tool as defined in claim 35, wherein the first spindle slide has a first arm orientated along the first guide and a second arm oriented transversely to the first guide, wherein the second arm is coupled to the second guide.

37. Multiple spindle machine tool as defined in claim 35, wherein the second spindle slide has a first arm oriented along the second guide and a second arm oriented transversely to the second guide, wherein the second arm is coupled to the first guide.

38. Multiple spindle machine tool as defined in claim 35, wherein the first spindle slide and the second spindle slide arm mirror symmetrical to each other.

* * * * *

UNITED STATES PATENT AND TRADEMARK OFFICE
CERTIFICATE OF CORRECTION

PATENT NO.         : 7,124,666 B2
APPLICATION NO. : 11/029283
DATED              : October 24, 2006
INVENTOR(S)        : Feinauer et al.

It is certified that error appears in the above-identified patent and that said Letters Patent is hereby corrected as shown below:

Column 11,

Line 48, "us" should read --as--.

Column 14,

Line 20, "arm" should read --are--.

Signed and Sealed this

Third Day of April, 2007

JON W. DUDAS
*Director of the United States Patent and Trademark Office*